R. Gleason,

Cake Basket,

№ 15,127.  Patented June 17, 1856.

UNITED STATES PATENT OFFICE.

R. GLEASON, JR., OF DORCHESTER, MASSACHUSETTS.

SILVER-PLATE CAKE AND FRUIT BASKET.

Specification of Letters Patent No. 15,127, dated June 17, 1856.

*To all whom it may concern:*

Be it known that I, R. GLEASON, Jr., of Dorchester, in the county of Norfolk and State of Massachusetts, have invented a new and useful Improvement in Cake and Fruit Baskets; and I do hereby declare that the following is a full, clear, and exact description of the same, reference being had to the annexed drawings, making a part of this specification, in which—

Figure 1:
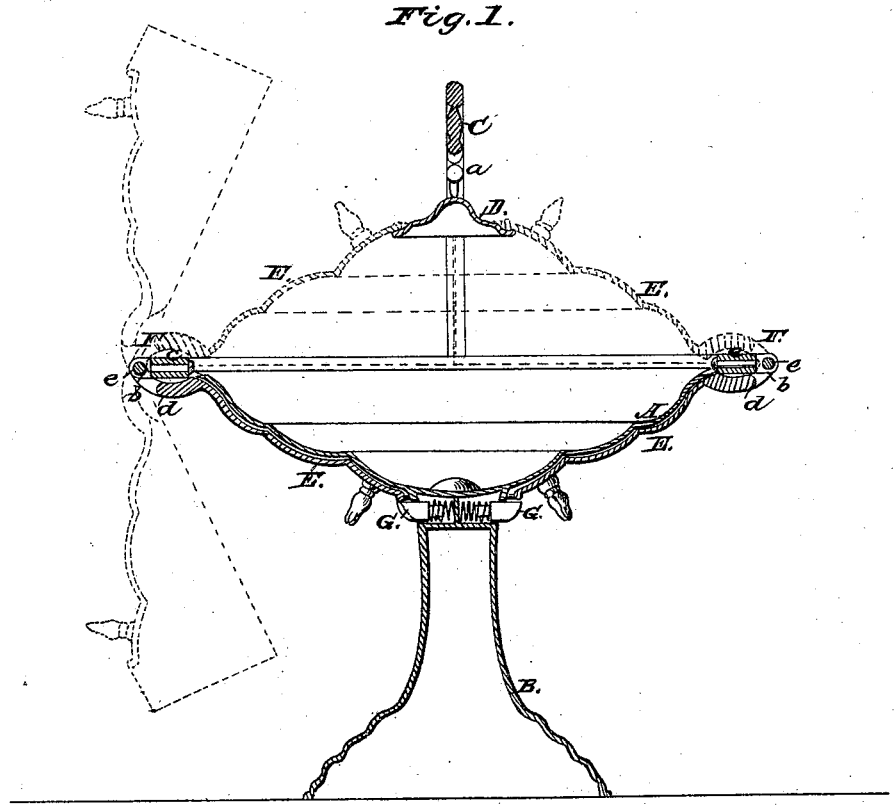
Figure 2:
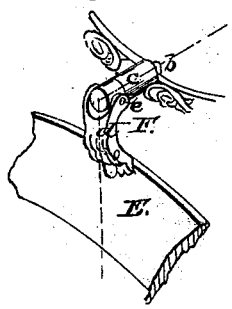

Figure 1, is a vertical section of my improvement, the plane of section being through the center. Fig. 2, is a detached proper view of one of the swivel joint hinges by which the lids are connected to the basket.

My invention consists in having two lids or covers connected to the basket by swivel joint hinges as will be presently shown, whereby the lids or cover may be fitted or adjusted over the top of the basket or turned down and secured underneath the basket.

This invention is designed for plated or metallic cake and fruit baskets.

To enable those skilled in the art to fully understand and construct my invention, I will proceed to describe it.

A, represents the body of the cake or fruit basket and B, represents the base which supports the body A.

C, is the handle of the basket having pendent arms (*a*), attached to it at its center said arms having a horizontal circular plate D, attached to them, the plate being over the center of the body A.

To the upper edge of the body A, there are attached two lids or covers E, E, the lids or covers being at opposite sides of the body A, and connected to it by swivel joint hinges F, F. These hinges are formed by having pintles (*b*), passing through sockets (*c*), attached to the edges of the body A. The pintles are secured in the sockets by nuts or heads on their inner ends the pintles being allowed to turn freely in the sockets. The outer ends of the pintles have forked arms (*d*), connected to them one to each by pins (*e*), which pass through the prongs of the forks and through the outer ends of the pintles. The lids or covers E, E, are of course made to conform to the shape of the body A. In the upper end of the base B, there are fitted two spring catches G, G, one for each lid or cover E. When the lids or covers are over the body A, of the basket their upper ends rest upon the edge of the plate D, as shown in red Fig. 1. When the lids or covers are not required to be over the basket they are raised in a vertical position as shown in red dotted lines Fig. 1, then turned vertically downward as shown in black dotted lines, and then turned upward underneath the body A, and are secured in that position by the catches G, G.

The above invention is extremely simple and enables the basket to be converted into an open or covered one in a moment of time.

Having thus described my invention what I claim as new and desire to secure by Letters Patent is:

Attaching the two lids or covers E, E, to the box A, of the basket by the swivel joint hinges F, F, constructed as shown; the lids or covers corresponding in form to that of the body A, whereby the lids or covers may be placed over the body A, or turned downward and secured by the catches G, G, underneath the body substantially as described.

R. GLEASON, JR.

Witnesses:
ANDREW J. VOSE,
EDWARD GLEASON.